United States Patent
Yoon et al.

(10) Patent No.: US 9,704,413 B2
(45) Date of Patent: *Jul. 11, 2017

(54) NON-SCORABLE RESPONSE FILTERS FOR SPEECH SCORING SYSTEMS

(71) Applicant: Educational Testing Service, Princton, NJ (US)

(72) Inventors: Su-Youn Yoon, Hamilton, NJ (US); Derrick Higgins, Chicago, IL (US); Klaus Zechner, Princeton, NJ (US); Shasha Xie, Sunnyvale, CA (US); Je Hun Jeon, Woburn, MA (US); Keelan Evanini, Pennington, NJ (US); Guangming Ling, Lawrenceville, NJ (US); Isaac Bejar, Hamilton, NJ (US)

(73) Assignee: Educational Testing Service, Princeton, NJ (US)

( * ) Notice: Subject to any disclaimer, the term of this patent is extended or adjusted under 35 U.S.C. 154(b) by 67 days.

This patent is subject to a terminal disclaimer.

(21) Appl. No.: 14/665,258

(22) Filed: Mar. 23, 2015

(65) Prior Publication Data
US 2015/0194147 A1    Jul. 9, 2015

Related U.S. Application Data

(63) Continuation-in-part of application No. 13/428,448, filed on Mar. 23, 2012, now Pat. No. 8,990,082.
(Continued)

(51) Int. Cl.
*G10L 15/00*    (2013.01)
*G09B 19/06*    (2006.01)
(Continued)

(52) U.S. Cl.
CPC ............ *G09B 19/06* (2013.01); *G10L 15/005* (2013.01); *G10L 15/01* (2013.01); *G10L 15/26* (2013.01);
(Continued)

(58) Field of Classification Search
CPC ....... G09B 19/06; G10L 15/005; G10L 15/01; G10L 15/26
(Continued)

(56) References Cited

U.S. PATENT DOCUMENTS 7,181,392 B2   2/2007  Gandhi et al.
7,392,187 B2   6/2008  Bejar et al.
(Continued)

OTHER PUBLICATIONS

Chang, Joon-Hyuk, Kim, Nam Soo; Voice Activity Detection Based on Complex Laplacian Model; Electronics Letters, 39(7); pp. 632-634; 2003.
(Continued)

*Primary Examiner* — Shaun Roberts
(74) *Attorney, Agent, or Firm* — Jones Day

(57) ABSTRACT

A method for scoring non-native speech includes receiving a speech sample spoken by a non-native speaker and performing automatic speech recognition and metric extraction on the speech sample to generate a transcript of the speech sample and a speech metric associated with the speech sample. The method further includes determining whether the speech sample is scorable or non-scorable based upon the transcript and speech metric, where the determination is based on an audio quality of the speech sample, an amount of speech of the speech sample, a degree to which the speech sample is off-topic, whether the speech sample includes speech from an incorrect language, or whether the speech sample includes plagiarized material. When the sample is determined to be non-scorable, an indication of non-scorability is associated with the speech sample. When the sample is determined to be scorable, the sample is provided to a scoring model for scoring.

20 Claims, 11 Drawing Sheets

Related U.S. Application Data

(60) Provisional application No. 61/467,503, filed on Mar. 25, 2011, provisional application No. 61/467,509, filed on Mar. 25, 2011, provisional application No. 61/974,587, filed on Apr. 3, 2014.

(51) Int. Cl.
| | | |
|---|---|---|
| *G10L 25/60* | (2013.01) | |
| *G10L 15/26* | (2006.01) | |
| *G10L 25/78* | (2013.01) | |
| *G10L 25/90* | (2013.01) | |
| *G10L 15/01* | (2013.01) | |

(52) U.S. Cl.
CPC .............. *G10L 25/60* (2013.01); *G10L 25/78* (2013.01); *G10L 25/90* (2013.01)

(58) Field of Classification Search
USPC .......................... 704/236, 231, 270; 434/157
See application file for complete search history.

(56) References Cited

U.S. PATENT DOCUMENTS

| | | | |
|---|---|---|---|
| 8,033,831 | B2 | 10/2011 | Julia et al. |
| 2002/0160341 | A1 | 10/2002 | Yamada et al. |
| 2003/0191639 | A1 | 10/2003 | Mazza |
| 2006/0074659 | A1* | 4/2006 | Adams .................... G10L 15/26 704/251 |
| 2007/0219776 | A1 | 9/2007 | Gamon et al. |
| 2008/0249773 | A1 | 10/2008 | Bejar et al. |
| 2009/0192798 | A1 | 7/2009 | Basson et al. |
| 2010/0145698 | A1 | 6/2010 | Chen et al. |
| 2011/0087491 | A1* | 4/2011 | Wittenstein ............. G10L 15/26 704/235 |

OTHER PUBLICATIONS

Chang, Joon-Hyuk, Kim, Nam Soo, Mitra, Sanjit; Voice Activity Detection Based on Multiple Statistical Models; IEEE Transactions on Signal Processing, 54(6-1); pp. 1965-1976; 2006.
De Jong, Nivja, Wempe, Ton; Praat Script to Detect syllable Nuclei and Measure Speech Rate Automatically; Behavior Research Methods, 41(2); pp. 385-390; 2009.
Ding, Yufeng, Simonoff, Jeffrey; An Investigation of Missing Data Methods for Classification Trees; Statistics Working Papers Series; 2006.
Hall, Mark, Frank, Eibe, Holmes, Geoffrey, Pfahringer, Bernhard, Reutemann, Peter, Witten, Ian; The WEKA Data Mining Software: An Update; In SIGKDD Explorations, 11(1); pp. 10-18; 2009.
Higgins, Derrick, Xi, Xiaoming, Zechner, Klaus, Williamson, David; A Three-Stage Approach to the Automated Scoring of Spontaneous Spoken Responses; Computer Speech and Language, 25; pp. 282-306; 2011.
Lamel, Lori, Gauvain, Jean-Luc; Cross-Lingual Experiments with Phone Recognition; International Conference on Acoustics, Speech , and Signal Processing, 2; pp. 507-510; 1993.
Li, Haizhou, Ma, Bin, Lee, Chin-Hui; A Vector Space Modeling Approach to Spoken Language Identification; IEEE Transactions on Audio, Speech & Language Processing, 15(1); pp. 271-284; 2007.
Lim, Boon Pang, Li, Haizhou, Chen, Yu; Language Identification Through Large Vocabulary Continuous Speech Recognition; International Symposium on Chinese Spoken Language Processing; pp. 49-52; 2004.
Lu, Guojun, Hankinson, Templar; A Technique Towards Automatic Audio Classification and Retrieval; In Signal Processing Proceedings, 1998; ICSP '98; pp. 1142-1145; 1998.
Shin, Jong Won, Chang, Joon-Hyuk, Yun, Hwan Sik, Kim, Nam Soo; Voice Activity Detection Based on Generalized Gamma Distribution; Proceedings of the IEEE International Conference on Acoustics, Speech, and Signal Processing; pp. 781-784; 2005.
Sohn, Jongseo, Kim, Nam Soo, Sung, Wonyong; A Statistical Model-Based Voice Activity Detection; IEEE Signal Processing Letter, 6(1); pp. 1-3; 1999.
Strik, Helmer, Cucchiarini, Catia; Automatic Assessment of Second Language Leaners' Fluency; Proceedings of the 14th International Congress of Phonetic Sciences; San Francisco, CA; pp. 759-762; 1999.
Xi, Xiaoming, Higgins, Derrick, Zechner, Klaus, Williamson, David; Automated Scoring of Spontaneous Speech Using SpeechRater v1.0; Educational Testing Service: Princeton, NJ; Research Report RR-08-62; 2008.
Zechner, Klaus, Higgins, Derrick, Xi, Xiaoming, Williamson, David; Automatic Scoring of Non-Native Spontaneous Speech in Tests of Spoken English; Speech Communication, 51(10); pp. 883-895; 2009.
Zissman, Marc; Comparison of Four Approaches to Automatic Language Identification of Telephone Speech; IEEE Transactions on Speech and Audio Processing, 4(1); pp. 31-44; 1996.
International Search Report; PCT/US2012/030285; Jun. 2012.
Written Opinion of the International Searching Authority; PCT/US2012/030285; Jun. 2012.

\* cited by examiner

NON-SCORABLE RESPONSE FILTERS FOR SPEECH SCORING SYSTEMS

CROSS-REFERENCE TO RELATED APPLICATIONS

This application is a continuation-in-part of U.S. patent application Ser. No. 13/428,448 filed on Mar. 23, 2012, issued as U.S. Pat. No. 8,990,082, entitled "Non-Scorable Response Filters for Speech Scoring Systems," the entirety of which is herein incorporated by reference.

This application claims priority to U.S. Provisional Patent Application No. 61/467,503, filed Mar. 25, 2011, entitled "Non-English Response Detection Method for Automated Proficiency Scoring System," U.S. Provisional Patent Application No. 61/467,509, filed Mar. 25, 2011, entitled "Non-scorable Response Detection for Automated Speaking Proficiency Assessment," and U.S. Provisional Application No. 61/974,587, filed Apr. 3, 2014, entitled "Human-Machine Score Difference Based Filter for Speech Scoring System," each of which are herein incorporated by reference in their entirety.

TECHNICAL FIELD

The technology described herein relates generally to automated speech assessment systems and more particularly to a method of filtering out non-scorable responses in automated speech assessment systems.

BACKGROUND

Automated speech assessment systems are commonly used in conjunction with standardized tests designed to test a non-native speaker's proficiency in speaking a certain language (e.g., Pearson Test of English Academic, Test of English as a Foreign Language, International English Language Testing System). In these tests, a verbal response may be elicited from a test-taker by providing a test prompt, which asks the test-taker to construct a particular type of verbal response. For example, the test prompt may ask the test-taker to read aloud a word or passage, describe an event, or state an opinion about a given topic. The test-taker's response may be received at a computer-based system and analyzed by an automated speech recognition (ASR) module to generate a transcript of the response. Using the transcript and other information extracted from the response, the automated speech assessment system may analyze the response and provide an assessment of the test-taker's proficiency in using a particular language. These systems may be configured to evaluate, for example, the test-taker's vocabulary range, pronunciation skill, fluency, and rate of speech. The present inventors have observed, however, that in some assessment scenarios, such automated speech assessment systems may be unable to provide a valid assessment of a test taker's speaking proficiency.

SUMMARY

The present disclosure is directed to systems and methods for scoring non-native speech. A speech sample spoken by a non-native speaker is received, and automatic speech recognition and metric extraction is performed on the speech sample to generate a transcript of the speech sample and a speech metric associated with the speech sample. A determination is made as to whether the speech sample is scorable or non-scorable based upon the transcript and the speech metric, where the determination is based on an audio quality of the speech sample, an amount of speech of the speech sample, a degree to which the speech sample is off-topic, whether the speech sample includes speech from an incorrect language, or whether the speech sample includes plagiarized material. When the sample is determined to be non-scorable, an indication of non-scorability is associated with the speech sample. When the sample is determined to be scorable, the sample is provided to a scoring model for scoring.

DETAILED DESCRIPTION

Automated speech assessment systems may be used to automatically assess a test-taker's proficiency in speaking a certain language, without a need for any human intervention or requiring only limited human intervention. These systems may be configured to automatically evaluate, for example, the test-taker's vocabulary range, pronunciation skill, fluency, and rate of speech. The present inventors have observed, however, that conventional automated scoring systems which lack a human scorer to screen test-taker responses may be complicated by a diverse array of problems. These problems may include, for example, poor audio quality of the sample to be scored, off-topic responses that do not address the test prompt, responses lacking an adequate amount of speech, responses using a language different than an expected language, and plagiarized responses, among others. These problems may make it difficult for conventional automated speech assessment systems to provide a valid assessment of the test-taker's speaking proficiency and may result in erroneous, unrepresentative scores being assessed.

In some situations, the problems may be the result of technical difficulties (e.g., test-taker's microphone being unplugged inadvertently, problems with the computer designated to receive the response, high background noise). In other situations, the problems may be created intentionally by a test-taker attempting to "game the system." For example, a test-taker lacking knowledge on a subject presented by a test prompt may simply respond with silence, or alternatively, the test-taker may respond by speaking about a subject that is irrelevant to the test prompt. In either situation, if the response is allowed to pass to the automated speech assessment system, an erroneous, unrepresentative score may be assessed.

Figure 1:
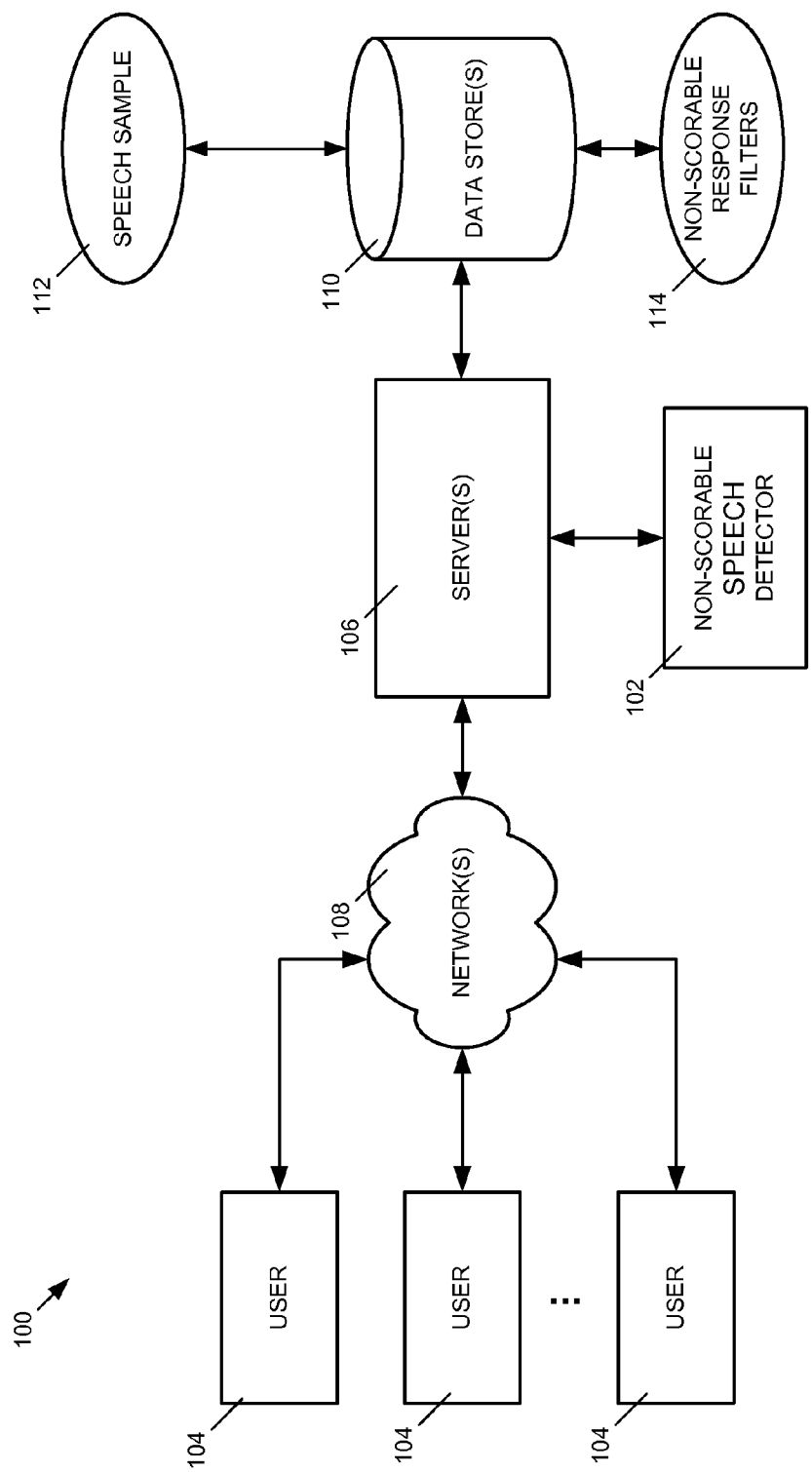
FIG. 1 depicts a computer-implemented system where users can interact with a non-scorable speech detector for detecting non-scorable speech hosted on one or more servers through a network.

FIG. 1 depicts a computer-implemented system 100 where users 104 can interact with a non-scorable speech detector 102 for detecting non-scorable speech hosted on one or more servers 106 through a network 108. The non-scorable speech detector 102 may be used to screen a speech sample 112 prior to its receipt at a scoring system so that the scoring system will not attempt to score faulty speech samples that are not properly scorable. To provide this screening, the non-scorable speech detector 102 may be configured to receive the speech sample 112 provided by a user 104 (e.g., and stored in a data store 110) and to make a binary determination as to whether the sample 112 contains scorable speech or non-scorable speech. If speech sample 112 is determined to contain non-scorable speech, then the non-scorable speech detector 102 may filter out the sample 112 and prevent it from being passed to the scoring system. Alternatively, if speech sample 112 is determined to contain scorable speech, then the sample 112 may be passed to the scoring system for scoring. Speech determined to be non-scorable by the non-scorable speech detector 102 may comprise a variety of forms. For example, non-scorable speech may include speech of an unexpected language, whispered speech, speech that is obscured by background noise, off-topic speech, plagiarized or "canned" responses, and silent non-responses.

The non-scorable speech detector 102 may be implemented using a processing system (e.g., one or more computer processors) executing software operations or routines for detecting non-scorable speech. User computers 104 can interact with the non-scorable speech detector 102 through a number of ways, such as over one or more networks 108. One or more servers 106 accessible through the networks 108 can host the non-scorable speech detector 102. It should be understood that the non-scorable speech detector 102 could also be provided on a stand-alone computer for access by a user 104. The one or more servers 106 may be responsive to one or more data stores 110 for providing input data to the non-scorable speech detector 102. The one or more data stores 110 may be used to store speech samples 112 and non-scorable speech filters 114. The non-scorable speech filters 114 may be used by the non-scorable speech detector 102 to determine whether the speech sample 112 comprises scorable or non-scorable speech. The speech sample 112 may comprise non-native speech spoken by a non-native speaker.

Figure 2:
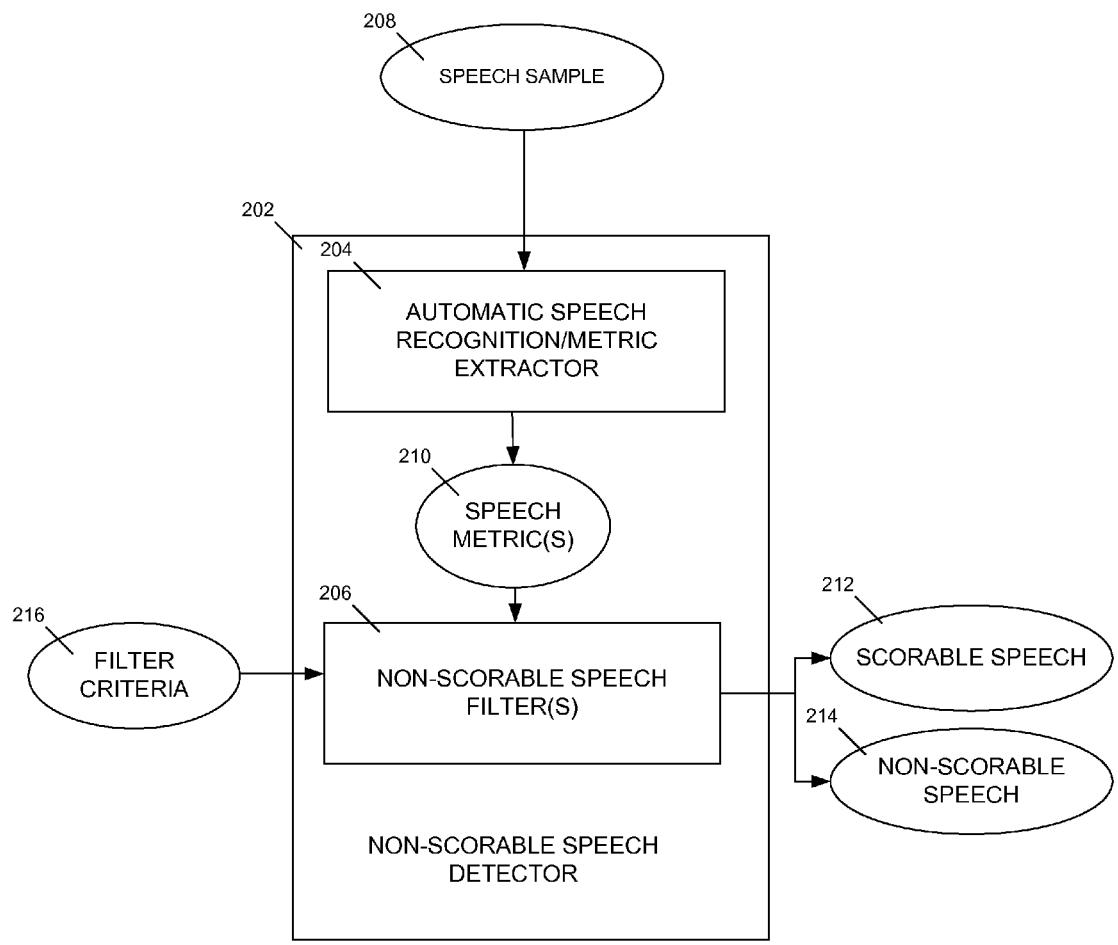
FIG. 2 is a block diagram depicting elements of a non-scorable speech detector.

FIG. 2 is a block diagram depicting elements of a non-scorable speech detector 202. The non-scorable speech detector 202 comprises an automatic speech recognition (ASR)/metric extractor module 204 and non-scorable speech filters 206. As described above, the objective of the non-scorable speech detector 202 is to determine whether a speech sample 208 contains scorable speech 212 or non-scorable speech 214. The ASR/metric extractor module 204 is configured to receive the speech sample 208 and to perform a number of functions. First, the ASR/metric extractor module 204 may perform an automated speech recognition (ASR) function, yielding a transcript of the speech sample 208. The transcript of the speech sample 208 may be accompanied by one or more confidence scores, each indicating a reliability of a recognition decision made by the ASR function. For example, a confidence score may be computed for recognized words of the speech sample 208 to indicate how likely it is that the word was correctly recognized. Confidence scores may also be computed at a phrase-level or a sentence-level.

In addition to providing the ASR function, the ASR/metric extractor module 204 may also perform a metric extracting function, enabling the module 204 to extract a plurality of speech metrics 210 associated with the speech sample 208. As an example, the ASR/metric extractor module 204 may be used to extract a word metric from the speech sample 208 that identifies the approximate number of words included in the sample 208. The speech metrics 210 extracted by the metric extracting function may be dependent on the ASR output, or the metrics may be independent of and unrelated to the ASR output. For example, metrics used in determining whether a response is off-topic may be highly dependent on the ASR output, while metrics used in assessing an audio quality of a sample may function without reference to the ASR output.

The transcript of the speech sample and the speech metrics 210 may be received by the non-scorable speech filters 206 and used in making the binary determination as to whether the speech sample 208 contains scorable speech 212 or non-scorable speech 214. If the speech sample is determined to contain non-scorable speech 214, the speech sample 208 may be identified as non-scorable, and the sample 208 may not be provided to a scoring system for scoring so that it is withheld and not scored. Alternatively, if the speech sample 208 is determined to contain scorable speech 212, the speech sample 208 may be provided to the scoring system for scoring.

The non-scorable speech filters 206 may include a plurality of individual filters, which may be configured to work independently of one another or in a collective manner, as determined by filter criteria 216. Filter criteria 216 may also be used to enable or disable particular filters of the non-scorable speech filters 206. For example, in certain testing situations utilizing open-ended test prompts, filter criteria 216 may be used to disable an off-topic filter, which would otherwise be used to filter out irrelevant or off-topic responses. As another example, if audio quality is determined to be of utmost importance for a given testing situation (e.g., speech samples taken under conditions causing high background noise in the sample), an audio quality filter may be enabled and all other filters may be disabled using the filter criteria 216. Combinations of multiple filters may also be combined with filter criteria 216 using various machine-learning algorithms and training and test data. For example, a Waikato Environment for Knowledge Analysis (WEKA) machine learning toolkit can be used to train a decision tree model to predict binary values for samples (0 for scorable 1 for non-scorable) by combining different filters. Training and test data can be selected from standardized test data samples (e.g., Test of English as a Foreign Language data).

Filter criteria 216 may also be used to enable a step-by-step, serial filtering process. In the step-by-step process, the plurality of filters comprising the non-scorable speech filters 206 may be arranged in a particular order. Rather than being received and evaluated by the plurality of filters in a parallel, simultaneous manner, the sample 208 may be required to proceed through the ordered filters serially. Any one particular filter in the series may filter out the sample 208 as non-scorable, such that filters later in the series need not evaluate the sample 208.

Figure 3:
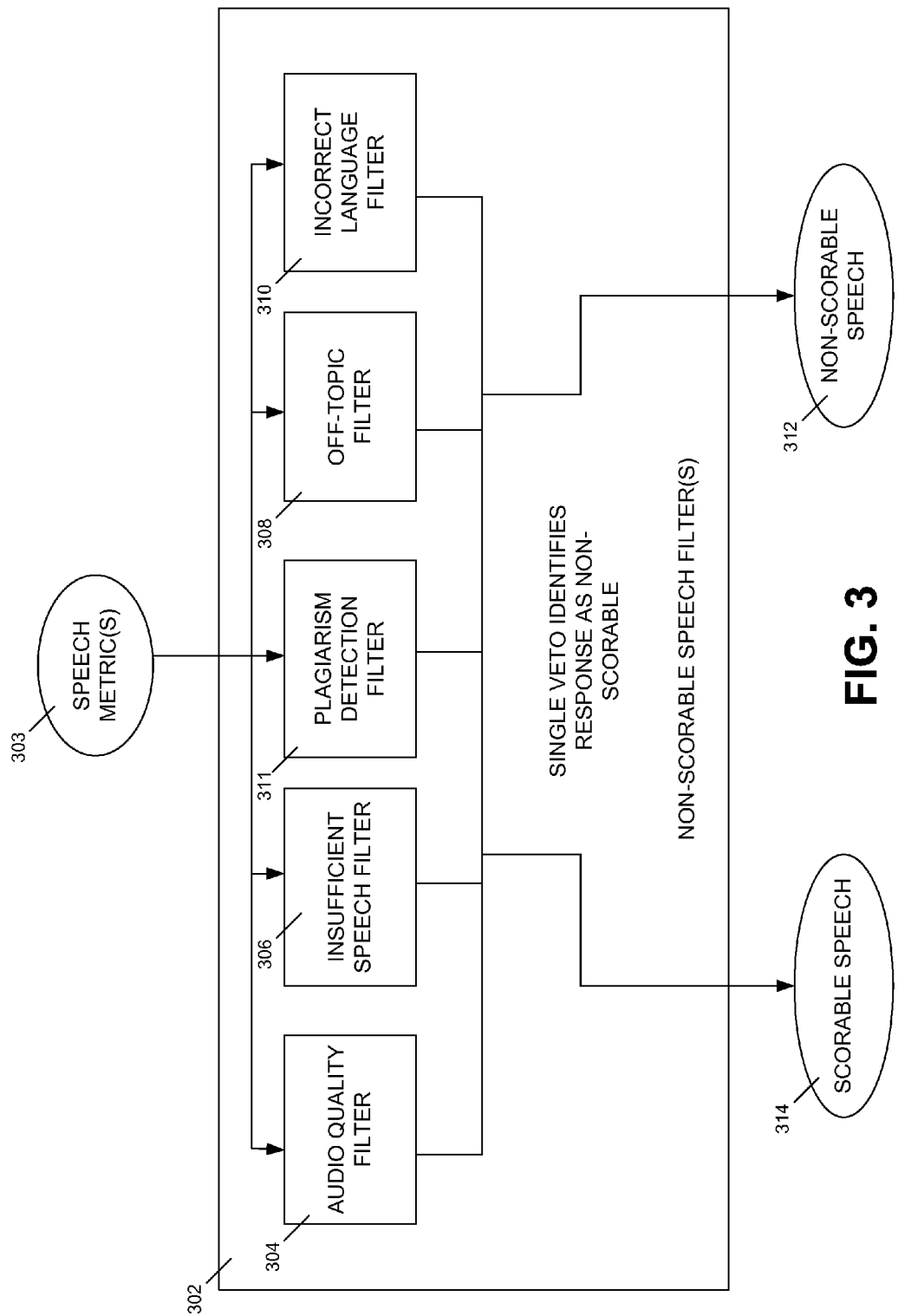
FIG. 3 is a block diagram depicting an example in which non-scorable speech filters have independently-operating filters.

FIG. 3 is a block diagram depicting an example in which non-scorable speech filters 302 have independently-operating filters. Speech metrics 303 for a speech sample may be received by an audio quality filter 304, an insufficient speech filter 306, an off-topic filter 308, an incorrect language filter 310, and a plagiarism detection filter 311. In the example of FIG. 3, a single veto from any one of the five filters identifying the speech sample as non-scorable will cause the non-scorable speech filters 302 to output a value identifying the sample as non-scorable speech 312. The non-scorable speech filters 302 will output a value identifying the sample as scorable speech 314 only when all filters have each determined that the sample is scorable in this example.

Figure 4:
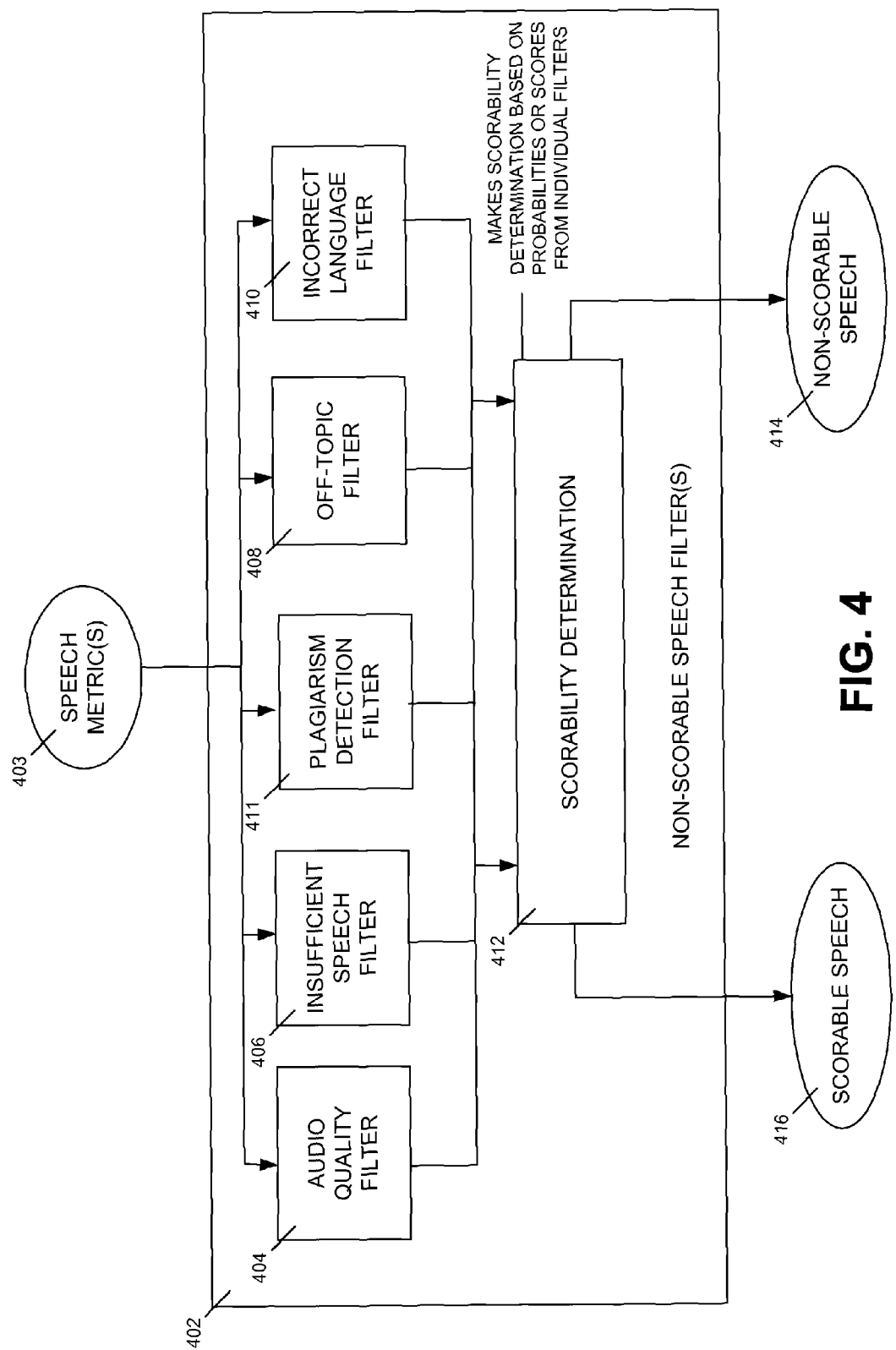
FIG. 4 is a block diagram depicting an example in which non-scorable speech filters have filters that collectively make a scorability determination for a speech sample.

By contrast, FIG. 4 is a block diagram depicting an example in which non-scorable speech filters 402 have filters that collectively make a scorability determination 412 for a speech sample. As in FIG. 3, non-scorable speech filters 402 receive speech metrics 403 for the sample, which are used by an audio quality filter 404, an insufficient speech filter 406, an off-topic filter 408, an incorrect language filter 410, and a plagiarism detection filter 411. However, rather a single filter independently determining that the sample is non-scorable, the example of FIG. 4 makes the scorability determination 412 based on probabilities or sample scores from each of the five individual filters. Thus, in FIG. 4, each filter assigns a probability or sample score to the sample, and after scores from all five filters have been considered, the sample is identified as scorable speech 416 or non-scorable speech 414. For example, a decision to score the speech sample can be made if all filters yield probabilities or scores over a certain threshold, or over individual thresholds set up for each filter. Suitable threshold scores or probabilities may be set through straightforward trial-and-error testing or reference speech samples.

Figure 5A:
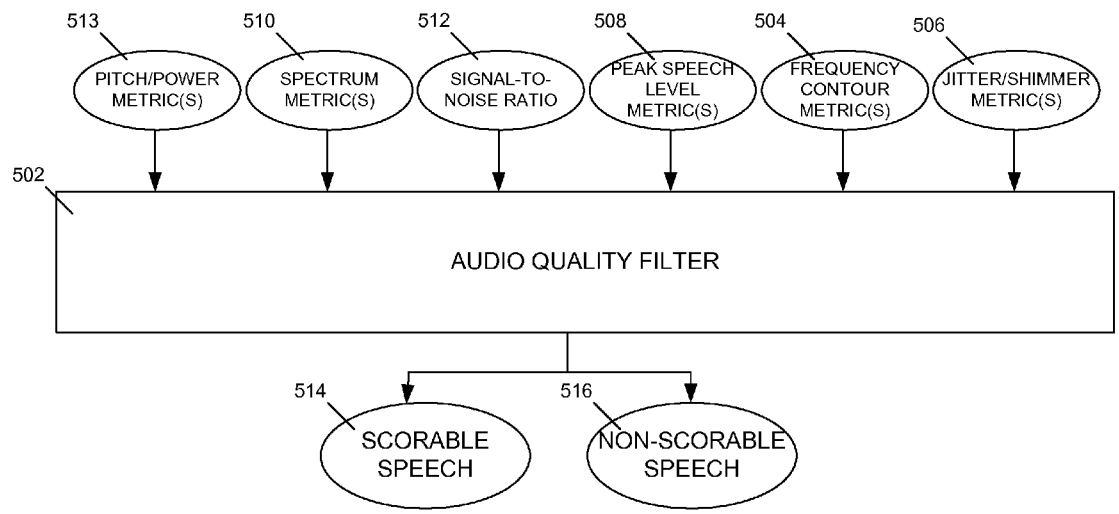
FIG. 5A is a block diagram illustrating example speech metrics considered by an audio quality filter.

FIG. 5A is a block diagram illustrating example speech metrics considered by an audio quality filter 502. A speech sample to be scored may suffer from various types of audio quality issues, including volume problems where the sample is too loud or too soft, noise problems where speech is obscured by loud background noise such as static or buzzing, microphone saturation problems caused by a test-taker's mouth being too close to a microphone, and problems caused by a low sampling rate. These audio quality issues may make it difficult for an automated scoring system to provide a valid assessment of speech contained in the sample. To address these issues, the audio quality filter 502 may be utilized to distinguish noise and other audio aberrations from clean speech and to filter out samples that should not be scored due to their audio quality problems.

The metrics considered by the audio quality filter 502 may primarily comprise acoustic metrics (e.g., pitch, energy, and spectrum metrics), some of which are not dependent on an ASR output. In the example of FIG. 5A, numerous low-level descriptor acoustic metrics are utilized by the audio quality filter 502. These low-level descriptor metrics include both prosodic metrics and spectrum-related metrics 510. Prosodic metrics may include frequency contour metrics 504, jitter and shimmer metrics 506, peak speech level metrics 508, and pitch and power metrics 513. Spectrum-related metrics 510 may include Mel-Frequency cepstral coefficient metrics, logarithmic power of Mel-Frequency band metrics, and eight line spectral pair frequencies computed from eight linear predictive coding (LPC) coefficient metrics. Jitter metrics may include both local, frame-to-frame pitch period length deviations and differential, frame-to-frame pitch period length deviations (i.e., jitter of the jitter). Shimmer metrics may include local, frame-to-frame amplitude deviations between pitch periods. The pitch and power metrics 513 may be used to evaluate pitch and power values throughout the duration of the sample, respectively. Spectrum-related metrics 510 may be particularly useful in detecting speech with loud background noise because noise may have different spectral characteristics than speech (e.g., noise tends to have no or few peaks in the frequency domain). Numerous other metrics may be used as part of the audio quality filter 502. For example, a signal-to-noise ratio (SNR) metric 512 may be used to approximate a ratio between a total energy of noise and a total energy of speech in the sample.

The audio quality filter 502 uses metrics, either independently or in various combinations, to make a binary determination as to whether a given response contains scorable speech 514 or non-scorable speech 516. The audio quality filter metrics may be evaluated using various machine-learning algorithms and training and test data to determine the best individual metrics and the best combinations of metrics. For example, a support vector machine (SVM) training algorithm can be used for training the audio quality filter 502. The filter 502 can be trained using representative samples, such as samples randomly selected from standardized test data (e.g., Test of English as a Foreign Language data). Certain metrics can be selected for consideration by the audio quality filter 502, such as the spectrum-related metrics 510. In one example, the audio quality filter 502 can be configured to consider the Mel-Frequency cepstral coefficient metric in detecting poor audio quality in responses.

Figure 5B:
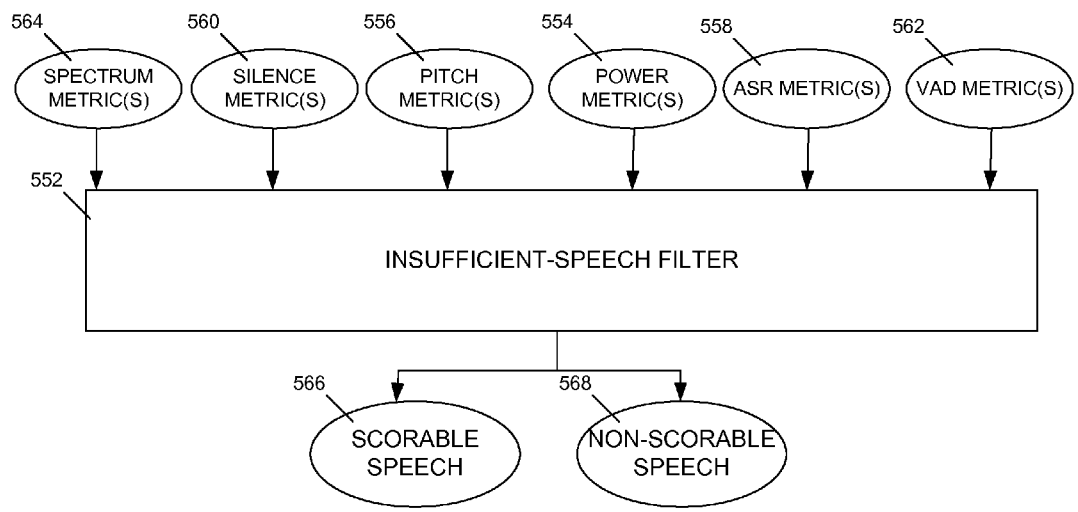
FIG. 5B is a block diagram illustrating example speech metrics considered by an insufficient-speech filter.

FIG. 5B is a block diagram illustrating example speech metrics considered by an insufficient-speech filter 552. The insufficient-speech filter 552 may be used to detect situations where a test-taker, in response to a test prompt, says nothing at all. The insufficient-speech filter 552 may also be used to detect instances where the test-taker provides a spoken response that is of an insufficient duration. Further, the insufficient-speech filter 552 may also be used to detect instances where a microphone has become unplugged and no sample signal is received. In traditional automated scoring systems, the response containing insufficient speech may be accepted by a scoring system and may be scored erroneously. To address this issue, the insufficient-speech filter 552 may be used to detect non-scorable responses that do not contain a sufficient amount of spoken speech and to prevent such non-scorable responses from being scored by the scoring system.

The metrics considered by the insufficient-speech filter 552 may comprise both ASR-based metrics 558 and non-ASR-based metrics. In the example of FIG. 5B, ASR-based metrics 558 may comprise fluency metrics, silence metrics 560, ASR-confidence metrics, and word metrics. Fluency metrics may be configured to evaluate the fluency of a test-taker's response. Silence metrics 560 may be configured to approximate measures of silence contained in the response, such as the mean duration of silent periods and the number of silent periods. ASR-confidence metrics may be considered by the insufficient-speech filter 552 because low speech recognition reliability may be indicative of samples lacking a sufficient amount of speech. Word metrics may be used to approximate a number of words in the response, which can also be used to indicate whether the response lacks a sufficient amount of speech.

Non-ASR-based metrics may comprise voice activity detection (VAD)-related metrics 562, amplitude metrics, spectrum metrics 564, pitch metrics 556, and power metrics 554. VAD-related metrics 562 are used to detect voice activity in a sample and may be used, for example, to detect a proportion of voiced frames in a response and a number and total duration of voiced regions in a response. Amplitude metrics may be used to detect abnormalities in energy throughout a sample. Such energy abnormalities may be relevant to the insufficient speech filter because silent non-responses may have an abnormal distribution in energy (e.g., non-responses may contain very low energy). Power metrics 554 and pitch metrics 556 may be designed to capture an overall distribution of pitch and power values in a speaker's response using mean and variance calculations. Spectrum metrics 564 may be used to investigate frequency characteristics of a sample that may indicate that the sample consists of an insufficient amount of speech.

The insufficient speech filter 552 uses metrics, either independently or in various combinations, to make a binary determination as to whether a given response contains scorable speech 566 or non-scorable speech 568. The insufficient speech filter metrics may be evaluated using various machine-learning algorithms and training and test data. In one example, the insufficient speech filter 552 includes decision tree models trained using a WEKA machine learning toolkit. Training and test data for the example can be drawn from an English language test of non-native speakers responding to spontaneous and recited speech prompts over a phone. In one example, the insufficient speech filter 552 is configured to consider both fluency metrics and VAD-related metrics 562 in detecting responses lacking a sufficient amount of speech.

Figure 6A:
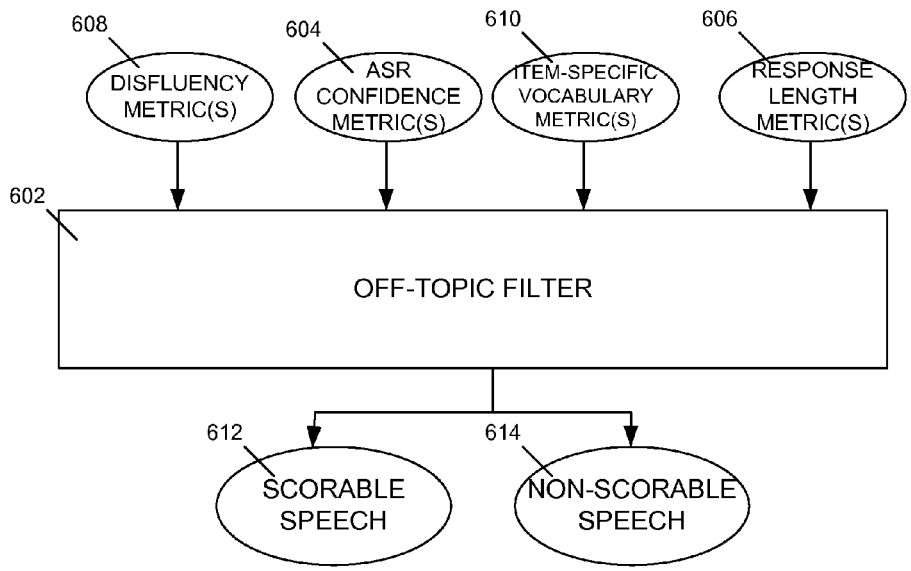
FIG. 6A is a block diagram illustrating example speech metrics considered by an off-topic filter.

FIG. 6A is a block diagram illustrating example speech metrics considered by an off-topic filter 602. In speech assessment situations where scoring is automated, a test-taker may inadvertently or purposely supply a response that is not sufficiently related to a provided test prompt. For example, a test-taker may attempt to respond to a test-prompt about politics by talking about sports, a topic with which he or she may be more comfortable. In traditional automated scoring systems, the irrelevant response may be accepted by a scoring system and may be nevertheless scored, even though this would be improper considering the purpose of the test. To enable more reliable scores and to prevent test-takers from gaming the system (cheating), the off-topic filter 602 may be used to validate the relevancy of responses before passing them on to the scoring system. Once detected, off-topic responses can be denoted as non-scorable speech and treated accordingly (i.e., withheld and not scored). Off-topic responses are considered to be those with irrelevant material and/or an excessive amount of mispronounced or unintelligible words as judged by a human listener.

The metrics considered by the off-topic filter 602 may be based on similarity metrics. Such similarity metrics may function by comparing a spoken response to an item-specific vocabulary list or reference texts including but not limited to the item's prompt, the item's stimuli, transcription of pre-collected responses, and texts related to the same topic. Transcriptions of pre-collected responses may be generated by human or a speech recognizer. For example, when a response is off-topic, most of the response's words may not be covered by an item-specific vocabulary list. Thus, item-specific vocabulary metrics 610 may be used to approximate an amount of out-of-vocabulary words provided in response to a given test prompt. Similarly, word error rate (WER) metrics may be used to estimate a similarity between a spoken response and the test prompt used to elicit the response.

There are many ways of determining similarity between response and the reference texts. One method is a Vector Space Model (VSM) method, which is also used in automated essay scoring systems. Under this method, both response and the reference texts are converted to vectors, whose elements are weighted using TF*IDF (term frequency, inverse document frequency). Then, a cosine similarity score between vectors can be used to estimate similarity between the responses the vectors originally represented.

Another method of determining similarity between responses and reference texts is the pointwise mutual information (PMI) method. PMI was introduced to calculate semantic similarity between words. It is based on word co-occurrence in a large corpus. Given two words, $w_1$ and $w_2$, their PMI is computed using:

$$PMI(w_1, w_2) = \log 2 \frac{p(w_1 \& w_2)}{p(w_1) \times p(w_2)}.$$

This indicates a statistical dependency between words $w_1$ and $w_2$ and can be used as a measure of the semantic similarity of the two words. Given the word-to-word similarity, the similarity between two documents may be calculated using the following function:

$$sim(D_1, D_2) = \frac{1}{2} \left( \frac{\sum_{w \in \{D_1\}} (maxSim(w, D_2) \times idf(w))}{\sum_{w \in \{D_1\}} idf(w)} + \frac{\sum_{w \in \{D_2\}} (maxSim(w, D_1) \times idf(w))}{\sum_{w \in \{D_2\}} idf(w)} \right)$$

For each word w in document $D_1$, a word in document $D_2$ having a highest similarity to word w is found. Similarly, for each word in $D_2$, the most similar words in $D_1$ are identified. A similarity score between the two documents may be calculated by combining the similarity of the words they contain, weighted by their word specificity (i.e., inverse document frequency values).

Other metrics unrelated to similarity measures may be considered by the off-topic filter 602. For example, an ASR confidence metric 604 may be considered by the off-topic filter 602. For example, an ASR system may generate a significant number of recognition errors when processing off-topic responses. Other metrics produced during the ASR process may also be considered by the off-topic filter 602, such as response-length metrics 606, words-per-minute metrics, number-of-unique-grammatical-verb-form metrics, and disfluency metrics 608, among others. For example, the disfluency metrics 608 may be used to investigate breaks, irregularities, or non-lexical utterances that may occur during speech and that may be indicative of an off-topic response.

The off-topic filter 602 uses metrics, either independently or in various combinations, to make a binary determination as to whether a given response contains scorable speech 612 or non-scorable speech 614. For example, the off-topic filter metrics can be evaluated using receiver operating characteristic (ROC) curves. ROC curves can be generated based on individual off-topic filter metrics and also based on combined off-topic filter metrics. Training and testing data can be selected from speech samples (e.g., responses to the Pearson Test of English Academic (PTE Academic)), with human raters identifying whether selected responses were relevant to a test prompt. In one example, the off-topic filter 602 may be configured to consider the ASR confidence metrics 604 in identifying off-topic responses.

Figure 6B:
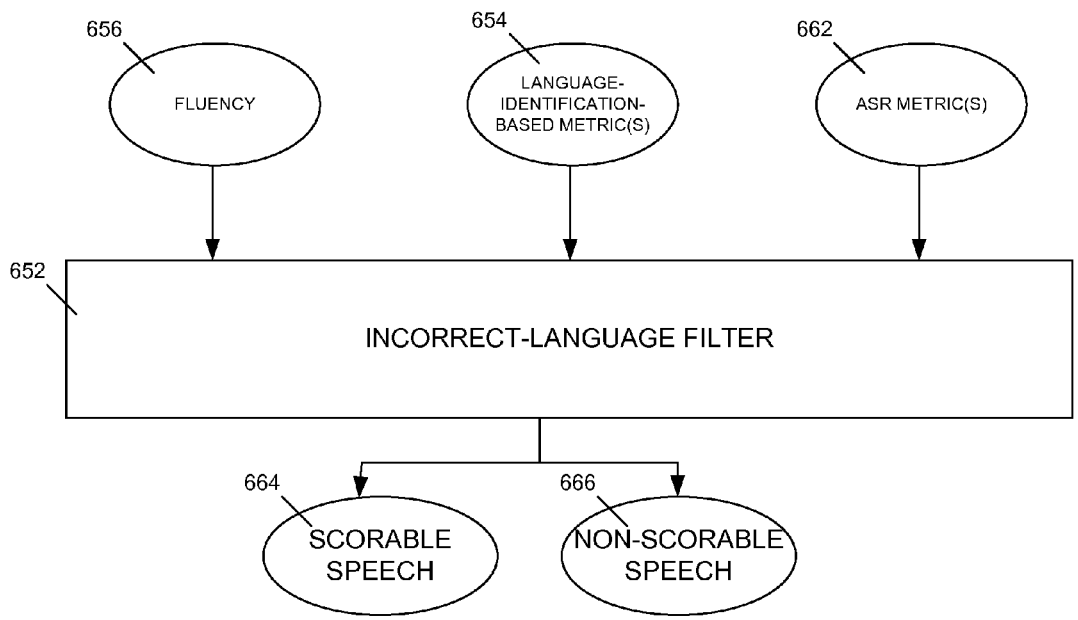
FIG. 6B is a block diagram illustrating example speech metrics considered by an incorrect-language filter.

FIG. 6B is a block diagram illustrating example speech metrics considered by an incorrect-language filter 652. In responding to a test prompt requesting a response in a particular language, test-takers may attempt to game the system (cheat) by instead answering in their native language. To address this issue, the incorrect language filter 652 may be used to identify a likelihood that a speech sample includes speech from a language different from an expected language. In an example, the expected language is English, and the incorrect-language filter is configured to make a binary determination as to whether the response is in English or not.

The incorrect-language filter 652 can be operable for use with both native speakers and non-native speakers of a particular language. Non-native speakers' speech tends to display non-standard pronunciation characteristics, which can make language filtering more challenging. For instance, when native Korean speakers speak in English, they may replace some English phonemes not in their language with their native phones, and epenthesize vowels within consonant clusters. Such behavior tends to reduce the phonetic and phonotactic distinctions between English and other languages, which may make language filtering more difficult. Further, the frequency of pronunciation errors is influenced by speakers' native language and proficiency level, with lower proficiency speakers being more likely to exhibit greater degrees of divergence from standard pronunciation.

The metrics considered by the incorrect-language filter 652 may comprise a number of metrics based on a combination of a phone recognizer and a language-dependent phone language model. Metric extraction may involve use of a plurality of language identification models to determine a likelihood that a particular language is used in a speech file. Each of the plurality of the language identification models may be associated with a different language. The language identification models may focus on phonetic and phonotactic differences among languages, wherein the frequencies of phones and phone sequences differ according to languages and wherein some phone sequences occur only in certain languages.

In the example of FIG. 6B, language identification models may be used to extract certain metrics from a speech sample, such as language-identification-based metrics 654, a fluency metric 656, and various ASR metrics 662. The language-identification-based metrics 654 may include, for example, a most likely language metric, a second most likely language metric, a confidence score for most likely language metric, and a difference from expected language confidence metric. The most likely language metric and the second most likely language metric utilize the language identification models to approximate the most likely and second most likely languages used in the sample. The difference from expected language confidence metric may be used to compute a difference between a confidence score associated with the language most likely associated with the speech sample and a second confidence score associated with the second most likely used language. Further, a speaking rate metric configured to approximate a speaking rate used in the sample may be considered by the incorrect language-filter 652.

The incorrect-language filter 652 uses metrics, either independently or in various combinations, to make a binary determination as to whether a given response contains scorable speech 664 or non-scorable speech 666. The incorrect-language filter metrics may be evaluated using various machine-learning algorithms and training and test data. For example, a Waikato Environment for Knowledge Analysis (WEKA) machine learning toolkit can be used to train a decision tree model to predict binary values for samples (0 for English and 1 for non-English). Training and test data can be selected, such as from the Oregon Graduate Institute (OGI) Multilanguage Corpus or other standard language identification development data set. For example, where the objective is to distinguish non-English responses from English responses, and the speakers are non-native speakers, English from non-native speakers can be used to train and evaluate the filter 652. Because the English proficiency levels of speakers may have an influence on the accuracy of non-English response detection, the responses used to train the filter 652 can be selected to include similar numbers of responses for a variety of different proficiency levels. Certain metrics may be considered by the incorrect language filter 652, such as the ASR metrics 662 and the speaking rate metric. In one example, the incorrect language filter 652 may be configured to consider the ASR metrics 662 and the speaking rate metric together in identifying responses containing an unexpected language.

Figure 7:
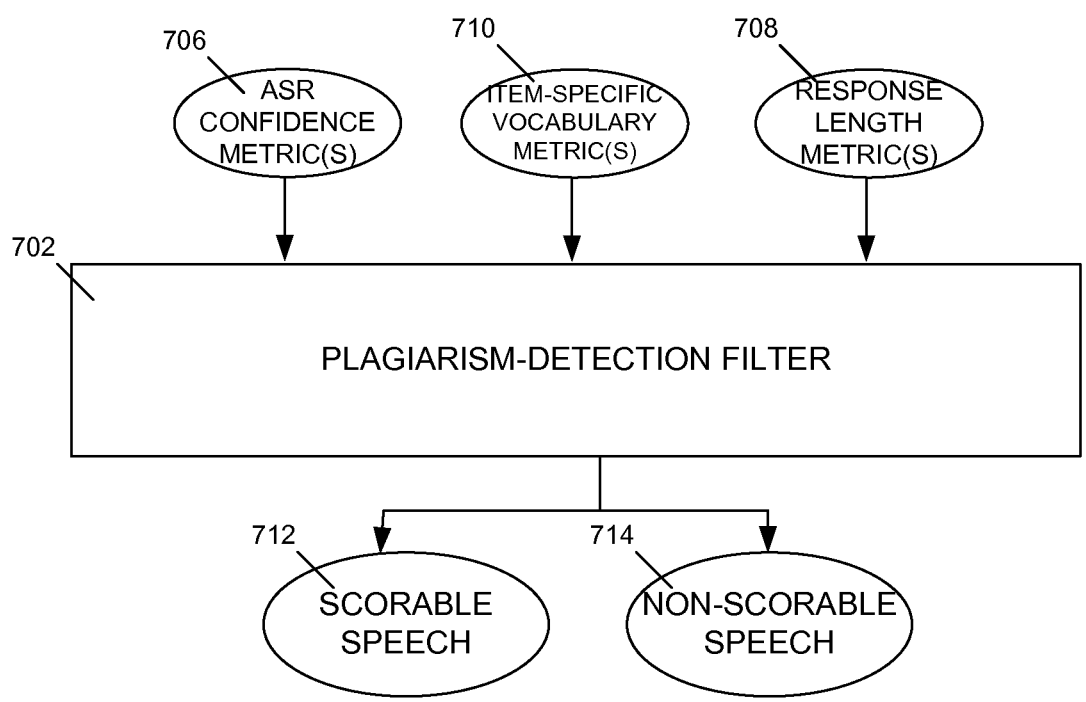
FIG. 7 is a block diagram illustrating example speech metrics considered by a plagiarism-detection filter.

FIG. 7 is a block diagram illustrating example speech metrics considered by a plagiarism-detection filter 702. Prior to testing, a test-taker may memorize "canned" responses from websites, books, and other sources, and during testing, the test-taker may seek to repeat from memory such responses. To address this issue, the plagiarism-detection filter 702 may be used to identify a likelihood that a response has been repeated from memory during testing.

The metrics considered by the plagiarism-detection filter 702 may be similar to the similarity metrics considered by the off-topic filter of FIG. 6A. The metrics considered by the plagiarism-detection filter 702 may compare a test-taker's response with a pool of reference texts. If a similarity value approximated by a metric is higher than a predetermined threshold, the response may be tagged as plagiarized and prevented from being scored by an automated scoring system. Because the similarity metrics of the plagiarism-detection filter 702 require that a response speech be compared to one or more reference texts (e.g., exemplary test responses published on the internet or in books), certain metrics of the plagiarism-detection filter 702 may be ASR-based metrics. Similar to the off-topic filter of FIG. 6A, the plagiarism-detection filter 702 may consider ASR confidence metrics 706, response length metrics 708, and item-specific vocabulary metrics 710. The plagiarism-detection filter 702 uses the metrics, either independently or in various combinations, to make a binary determination as to whether a given response contains scorable speech 712 or non-scorable speech 714.

Figure 8:
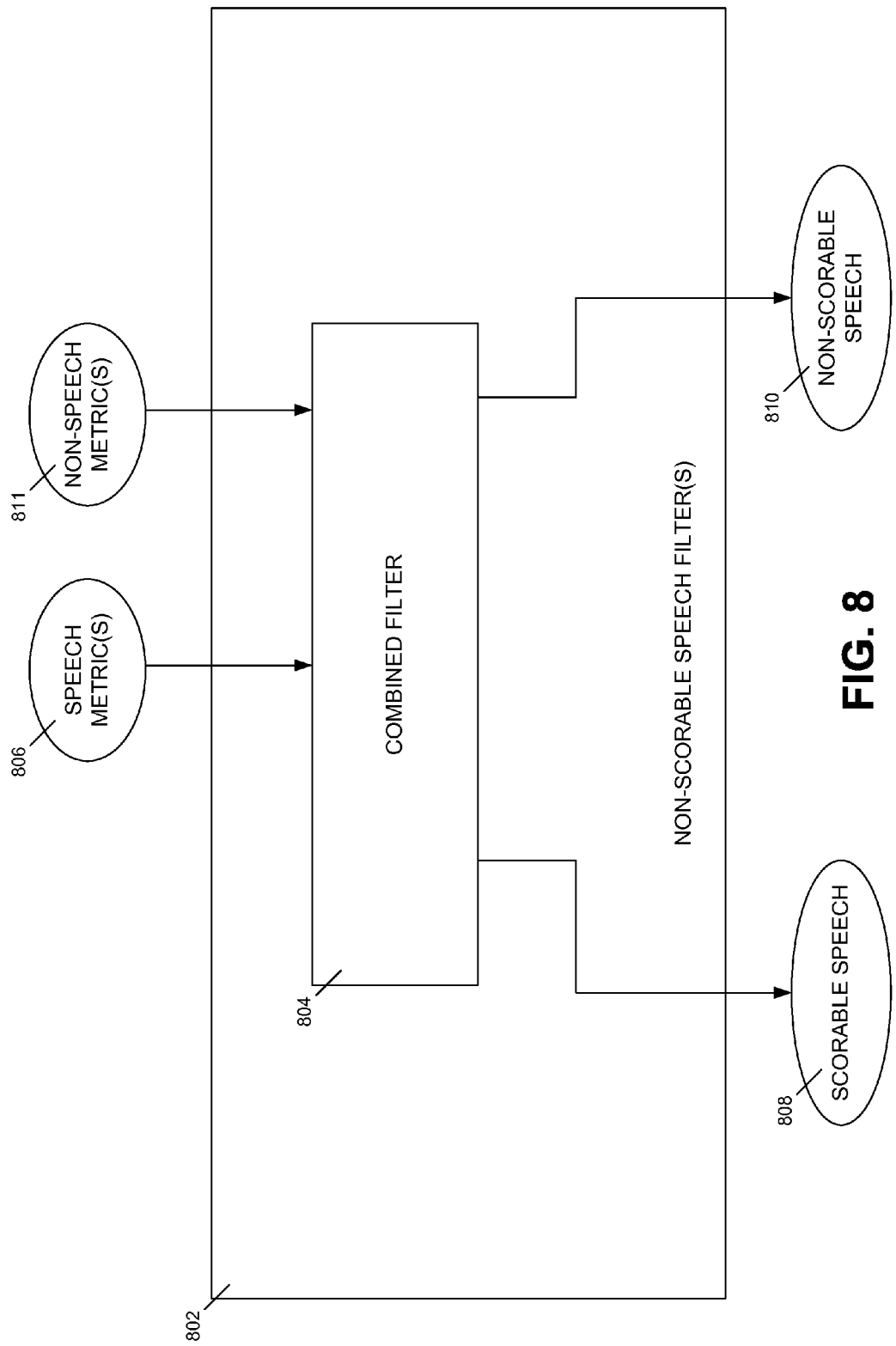
FIG. 8 is a block diagram depicting non-scorable speech filters comprising a combined filter.

FIG. 8 is a block diagram depicting non-scorable speech filters 802 comprising a combined filter 804. In the example of FIG. 8, speech metrics 806 are received by the combined filter 804, which makes a determination as to whether a given speech sample contains scorable speech 808 or non-scorable speech 810. The combined filter 804 may combine aspects of the audio quality filter, insufficient speech filter, off-topic filter, incorrect language filter, and plagiarism detection filter in making a scorability determination. The combination of the various filters may allow for a plurality of diverse metrics to be considered together in making the scorability determination. Thus, metrics that were previously associated with only a single filter may be used together in the combined filter 804. Combinations of filters and metrics may be evaluated with training and test data sets and/or trial and error testing to determine particular sets of filters and metrics that provide accurate determinations of a sample's scorability.

In addition to basing decisions on whether a speech sample is scorable or non-scorable based on metrics 806 extracted from the speech sample itself, a non-scorable speech filter 802, in one embodiment, considers non-speech metrics 811 in making the scorable/non-scorable determination. For example, a non-scorable speech filter may consider demographic data associated with a speaker as well as performance of that speaker on other test items (e.g., whether the speaker scored well on other reading, writing, or speaking test items) in determining whether an score of sufficient quality is likely to be generated for that person. Such determinations may be based on a variety of premises. In one example, an automatic speech recognizer is known to have difficulty in recognizing speech from a particular sex from a particular region or country. If a speaker matches that demographic information and has scored low on other test items, then it may be anticipated that the automatic speech recognizer and other modules for generating speech metrics will struggle to provide accurate transcripts and metrics. As such, the non-scorable speech filter 802 may identify that speech sample as non-scorable and route it for human scoring so that the speaker can receive a fair and accurate score. In one embodiment, the non-scorable speech filter considers the non-speech metric data 811 alone in making a scorable/non-scorable determination, while in other embodiments, non-scorable metrics 811 are considered in combination with speech metrics 806 by the non-scorable speech filter 802.

Figure 9:
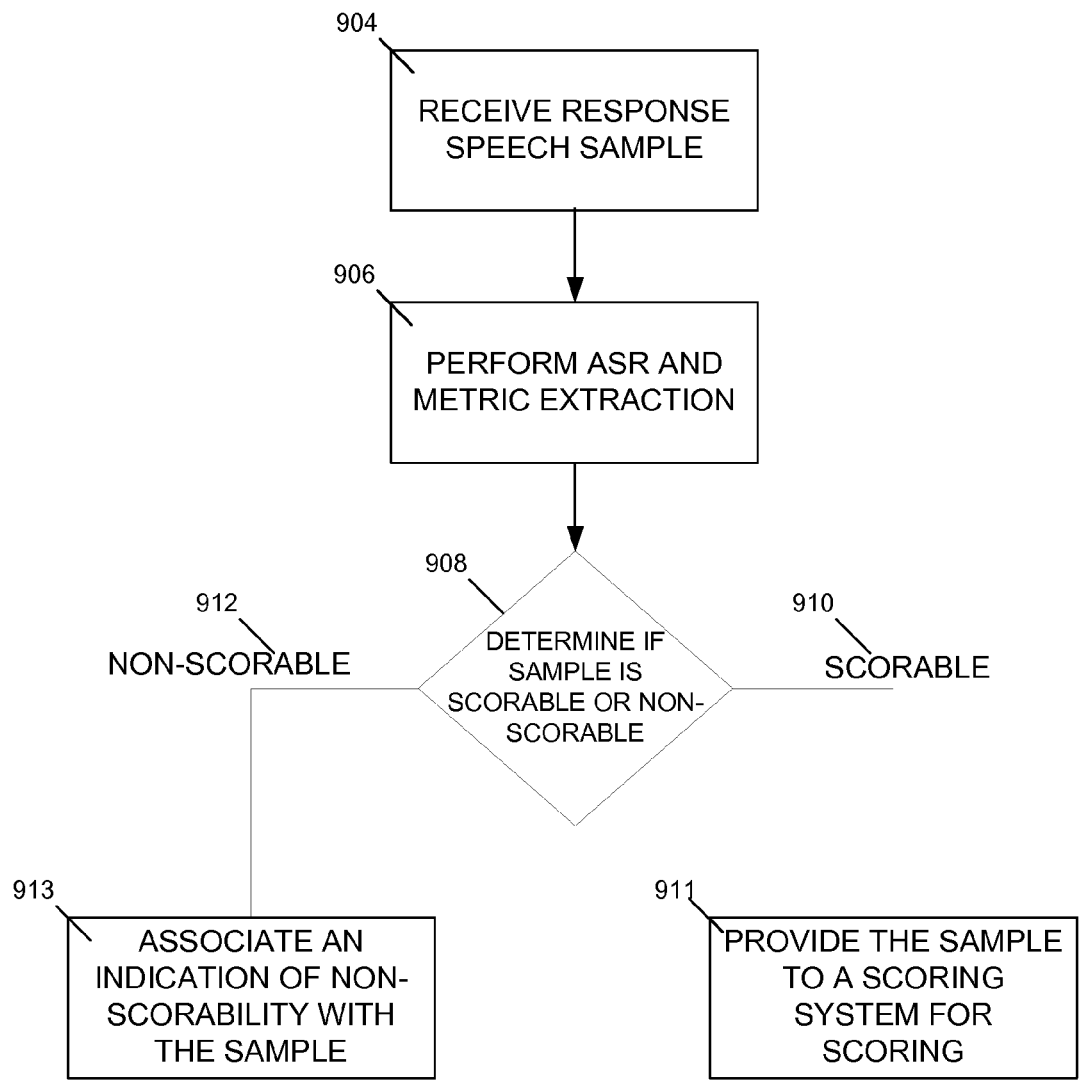
FIG. 9 is a flowchart depicting a method for scoring a response speech sample.

FIG. 9 is a flowchart depicting a method for scoring a response speech sample. The response speech sample is received 904 at a non-scorable response detector, which may be configured to perform an ASR function and a metric extraction function 906. The non-scorable response detector may be further configured to make a binary determination 908 as to whether the speech sample contains scorable speech or non-scorable speech. If the speech sample is determined to be non-scorable 912, an indication of non-scorability may be associated with the speech sample 913, such that the sample will not receive a score. Alternatively, if the speech sample is determined to be scorable 910, the speech sample may be provided to a scoring system for scoring 911. Filtering out non-scorable speech from the scoring model in this manner may help to ensure that all scores assessed are valid and representative of the speech sample. As noted above, the non-scorable response detector may be used in situations where the scoring model comprises an automated scoring system and no human scorer is used to screen responses prior to their receipt at the scoring model.

Figure 10A:
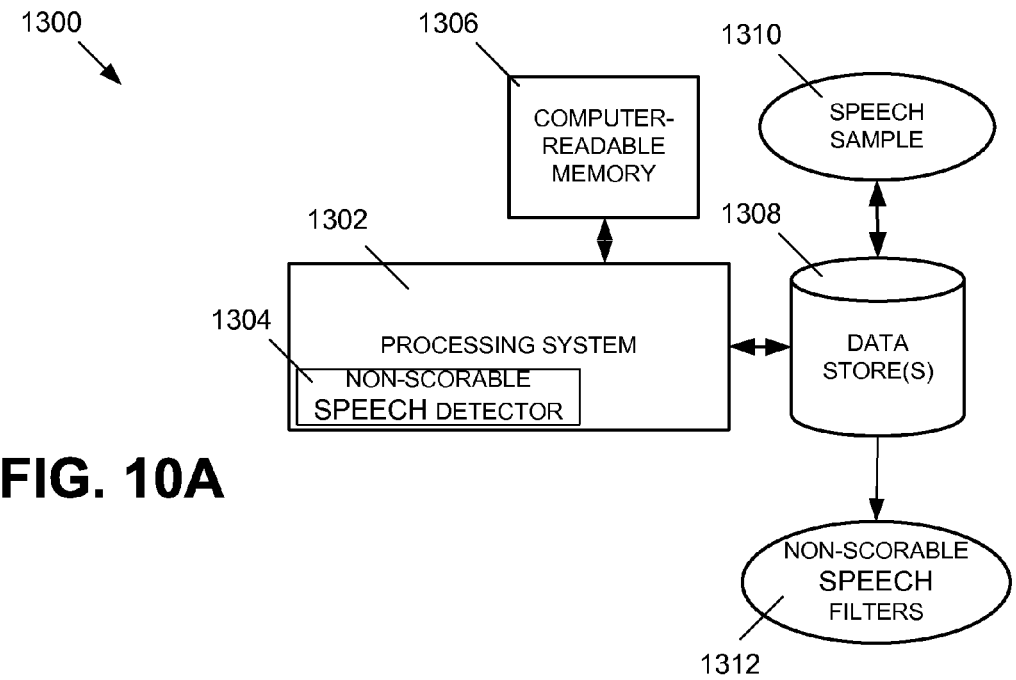
FIGS. 10A, 10B, and 10C depict example systems for use in implementing a method of scoring non-native speech.
Figure 10B:
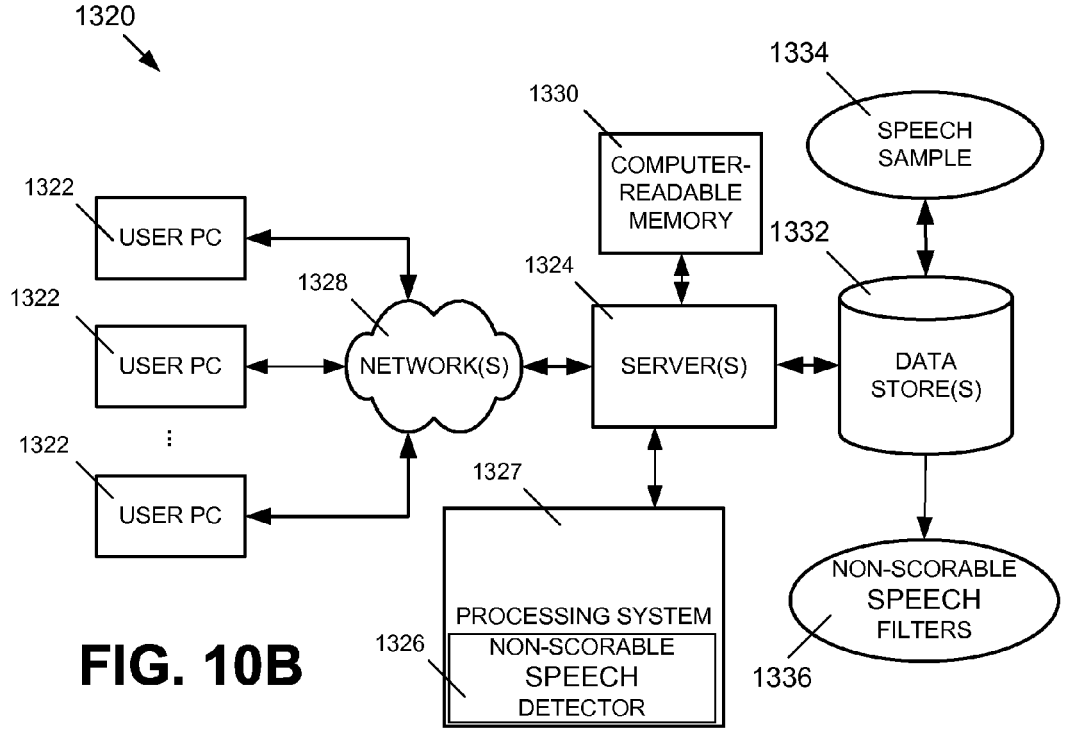
Figure 10C:
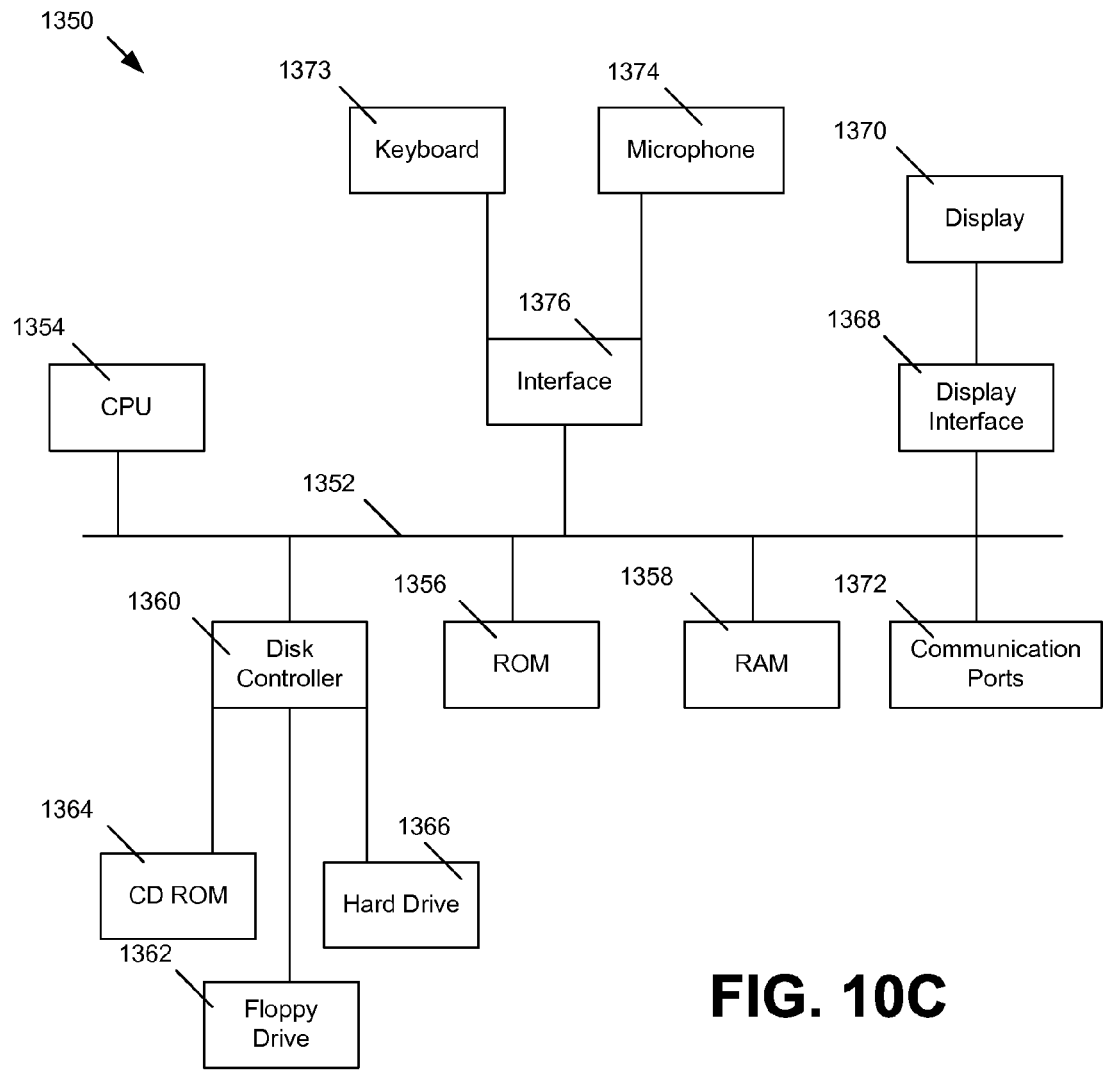

FIGS. 10A, 10B, and 10C depict example systems for use in implementing a method of scoring non-native speech. For example, FIG. 10A depicts an exemplary system 1300 that includes a standalone computer architecture where a processing system 1302 (e.g., one or more computer processors located in a given computer or in multiple computers that may be separate and distinct from one another) includes a non-scorable speech detector 1304 being executed on it. The processing system 1302 has access to a computer-readable memory 1306 in addition to one or more data stores 1308. The one or more data stores 1308 may include speech samples 1310 as well as non-scorable speech filters 1312.

FIG. 10B depicts a system 1320 that includes a client server architecture. One or more user PCs 1322 access one or more servers 1324 running a non-scorable speech detector 1326 on a processing system 1327 via one or more networks 1328. The one or more servers 1324 may access a computer readable memory 1330 as well as one or more data stores 1332. The one or more data stores 1332 may contain a speech sample 1334 as well as non-scorable speech filters 1336.

FIG. 10C shows a block diagram of exemplary hardware for a standalone computer architecture 1350, such as the architecture depicted in FIG. 10A that may be used to contain and/or implement the program instructions of system embodiments of the present invention. A bus 1352 may serve as the information highway interconnecting the other illustrated components of the hardware. A processing system 1354 labeled CPU (central processing unit) (e.g., one or more computer processors at a given computer or at multiple computers), may perform calculations and logic operations required to execute a program. A non-transitory processor-readable storage medium, such as read only memory (ROM) 1356 and random access memory (RAM) 1358, may be in communication with the processing system 1354 and may contain one or more programming instructions for performing the method of scoring non-native speech. Optionally, program instructions may be stored on a non-transitory computer readable storage medium such as a magnetic disk, optical disk, recordable memory device, flash memory, or other physical storage medium.

A disk controller 1360 interfaces one or more optional disk drives to the system bus 1352. These disk drives may be external or internal floppy disk drives such as 1362, external or internal CD-ROM, CD-R, CD-RW or DVD drives such as 1364, or external or internal hard drives 1366. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1360, the ROM 1356 and/or the RAM 1358. Preferably, the processor 1354 may access each component as required.

A display interface 1368 may permit information from the bus 1352 to be displayed on a display 1370 in audio, graphic, or alphanumeric format. Communication with external devices may optionally occur using various communication ports 1372.

In addition to the standard computer-type components, the hardware may also include data input devices, such as a keyboard 1373, or other input device 1374, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A computer-implemented method of scoring non-native speech, comprising:
   receiving a speech sample spoken by a non-native speaker to be scored by a scoring model using a processing system, wherein the scoring model generates scores for speech samples based on one or more speech metrics;
   performing automatic speech recognition on the speech sample to generate a transcript of the speech sample;
   processing the speech sample to generate a plurality of speech metrics and a confidence score associated with one of the scoring model speech metrics using the processing system;
   applying a plurality of non-scorable response filters to the plurality of speech metrics and the confidence score using the processing system;
   determining whether the speech sample is scorable or non-scorable based upon the transcript and a collective application of the non-scorable response filters to the plurality of speech metrics and the confidence score using the processing system, wherein the determining is based on assessment of audio quality of the speech sample, an amount of speech of the speech sample, a degree to which the speech sample is off-topic, and whether the speech sample includes speech from an incorrect language;
   associating an indication of non-scorability with the speech sample when the sample is determined to be non-scorable using the processing system; and
   providing the sample to a scoring model for scoring when the sample is determined to be scorable using the processing system.

2. The method of claim 1, further comprising:
   identifying a non-speech metric associated with a speaker of the non-native speech;
   wherein determining whether the speech sample is scorable or non-scorable is based in part on the non-speech metric.

3. The method of claim 2, wherein the non-speech metric is a demographic metric.

4. The method of claim 3, wherein the demographic metric is a sex, a nationality, or a region associated with the speaker.

5. The method of claim 2, wherein the non-speech metric is a score for the speaker on a different test item.

6. The method of claim 5, wherein the different test item is a reading item or a writing item.

7. The method of claim 1, wherein the confidence score is associated with a speech metric generated by an automatic speech recognizer.

8. The method of claim 1, wherein the confidence score is associated with a module that generates one of the one or more speech metrics.

9. The method of claim 1, wherein the speech sample is not provided to the scoring model when the speech sample is determined to be non-scorable.

10. The method of claim 1, wherein the speech sample is determined to be scorable or non-scorable based upon an audio-quality filter.

11. The method of claim 10, wherein the audio-quality filter identifies a likelihood that the speech sample is scorable or non-scorable based upon at least one of a spectrum metric, a power metric, a signal-to-noise ratio metric, a peak-speech-level metric, a frequency-contour metric, a jitter metric, a shimmer metric, or a pitch metric.

12. The method of claim 1, wherein the speech sample is determined to be scorable or non-scorable based upon an insufficient-speech filter.

13. The method of claim 12, wherein the insufficient-speech filter identifies a likelihood that the speech sample contains an insufficient amount of spoken speech based upon a spectrum metric, a voice activity detection metric, a silence metric, a pitch metric, a power metric, or an automated speech recognition metric.

14. The method of claim 1, wherein the speech sample is determined to be scorable or non-scorable based upon an incorrect-language filter.

15. The method of claim 14, wherein the incorrect-language filter identifies, based upon language-identification-based metrics, a likelihood that the speech sample is non-scorable because the sample includes speech of a language different than an expected language.

16. The method of claim 14, wherein the incorrect-language filter uses a language identification method that is a combination of a phone recognizer and a plurality of language models, wherein each of the language models is associated with a different language.

17. The method of claim 1, wherein the speech sample is determined to be scorable or non-scorable based upon a plagiarism detection filter.

18. The method of claim 17, wherein the plagiarism detection filter identifies a likelihood that the speech sample is non-scorable based upon an automatic-speech-recognizer confidence metric or a similarity of the speech sample to a particular text.

19. A system for scoring non-native speech, comprising:
a processing system;
one or more non-transitory computer-readable storage mediums containing instructions configured to cause the processing system to perform operations including:
receiving a speech sample spoken by a non-native speaker to be scored by a scoring model, wherein the scoring model generates scores for speech samples based on one or more speech metrics;
performing automatic speech recognition on the speech sample to generate a transcript of the speech sample;
processing the speech sample to generate a plurality of speech metrics and a confidence score associated with one of the scoring model speech metrics;
applying a plurality of non-scorable response filters to the plurality of speech metrics and the confidence score;
determining whether the speech sample is scorable or non-scorable based upon the transcript and a collective application of the non-scorable response filters to the plurality of speech metrics and the confidence score, wherein the determining is based on assessment of audio quality of the speech sample, an amount of speech of the speech sample, a degree to which the speech sample is off-topic, and whether the speech sample includes speech from an incorrect language;
associating an indication of non-scorability with the speech sample when the sample is determined to be non-scorable; and
providing the sample to a scoring model for scoring when the sample is determined to be scorable.

20. A non-transitory computer program product for scoring non-native speech, tangibly embodied in a machine-readable non-transitory storage medium, including instructions configured to cause a processing system to execute steps including:
receiving a speech sample spoken by a non-native speaker to be scored by a scoring model, wherein the scoring model generates scores for speech samples based on one or more speech metrics;
performing automatic speech recognition on the speech sample to generate a transcript of the speech sample;
processing the speech sample to generate a plurality of speech metrics and a confidence score associated with one of the scoring model speech metrics;
applying a plurality of non-scorable response filters to the plurality of speech metrics and the confidence score;
determining whether the speech sample is scorable or non-scorable based upon the transcript and a collective application of the non-scorable response filters to the plurality of speech metrics and the confidence score, wherein the determining is based on assessment of audio quality of the speech sample, an amount of speech of the speech sample, a degree to which the speech sample is off-topic, and whether the speech sample includes speech from an incorrect language;
associating an indication of non-scorability with the speech sample when the sample is determined to be non-scorable; and
providing the sample to a scoring model for scoring when the sample is determined to be scorable.

* * * * *